(12) United States Patent
Wood

(10) Patent No.: US 6,478,361 B1
(45) Date of Patent: Nov. 12, 2002

(54) TARPAULIN TIGHTENING DEVICE

(76) Inventor: Ronald L. Wood, 311 W. First St., Moulton, IA (US) 52572

(*) Notice: Subject to any disclaimer, the term of this patent is extended or adjusted under 35 U.S.C. 154(b) by 0 days.

(21) Appl. No.: 10/041,862

(22) Filed: Oct. 22, 2001

(51) Int. Cl.$^7$ .................................................. B60J 7/00
(52) U.S. Cl. .................................................... 296/98
(58) Field of Search ................ 296/98, 100.11–100.16; 160/243, 290.1; 135/903, 907

(56) References Cited

U.S. PATENT DOCUMENTS

| | | | |
|---|---|---|---|
| 3,138,399 A | * 6/1964 | Hughes | 296/100.15 |
| 3,612,145 A | * 10/1971 | Darula | 135/903 |
| 4,095,840 A | * 6/1978 | Woodard | 296/100.15 |
| RE31,746 E | 11/1984 | Dimmer et al. | |
| 4,484,777 A | * 11/1984 | Michel | 296/98 |
| 4,518,193 A | 5/1985 | Heider et al. | |
| 4,529,098 A | * 7/1985 | Heider et al. | 296/98 |
| 4,657,062 A | * 4/1987 | Tuerk | 160/243 |
| 4,659,134 A | * 4/1987 | Johnson | 296/98 |
| 4,691,957 A | * 9/1987 | Ellingson | 296/98 |
| 4,995,663 A | * 2/1991 | Weaver et al. | 296/100.11 |
| 5,180,203 A | * 1/1993 | Goudy | 296/98 |
| 5,186,231 A | * 2/1993 | Lewis | 296/98 |
| 5,429,408 A | * 7/1995 | Henning et al. | 296/100.12 |
| 5,542,733 A | * 8/1996 | Kintz | 296/98 |
| 5,549,347 A | * 8/1996 | Anderson | 296/98 |
| 5,692,793 A | * 12/1997 | Wilson et al. | 296/100.15 |
| 5,765,901 A | * 6/1998 | Wilkens | 296/98 |
| 5,911,467 A | * 6/1999 | Evans et al. | 296/181 |
| 6,193,299 B1 | * 2/2001 | Than | 296/100.15 |

\* cited by examiner

*Primary Examiner*—D. Glenn Dayoan
*Assistant Examiner*—Greg Blankenship
(74) *Attorney, Agent, or Firm*—McKee, Voorhees & Sease, P.L.C.

(57) ABSTRACT

A tarpaulin tightening device includes a bar extension member which can be attached to the end of a bar upon which the tarpaulin is rolled. A ratchet engaging pawl is movable from a detached position free from engagement with the ratchet wheel to an engaged position engaging the ratchet teeth of the ratchet member. At the same time a hook member is pivoted from a disengaged position to an engaged position engaging a bearing surface on the bar extension and holding the ratchet teeth in engagement with the ratchet pawl. This permits rotation of the bar extension and the bar to tighten the roll and thus tighten the tarpaulin.

11 Claims, 5 Drawing Sheets

TARPAULIN TIGHTENING DEVICE

BACKGROUND OF THE INVENTION

This invention relates to a tarpaulin tightening device and method for using same.

U.S. Pat. Re 31,746 shows a rollup tarp for trailers designed to be loaded through an open top. The device shown in this patent includes a crank handle which can be used to roll the tarp from its open to its closed position from the rear of the trailer body. After the tarpaulin has been tightened, the crank handle is attached to the rear of the trailer and holds the tarpaulin in place.

In some applications such as railroad cars, there is not room between the cars to easily operate a crank handle attached to the tarpaulin and the railroad car in the manner shown in reissue Pat. Re 31,746.

Therefore a primary object of the present invention is the provision of an improved tarpaulin tightening device and method for using same which does not require the permanent attachment of a crank handle to the end of the bar upon which the tarpaulin is rolled.

A further object of the present invention is the provision of an improved tarpaulin tightening device and method for using same which permits a crank handle to be attached and detached at the time of tightening, but which holds the tarpaulin in a tightened condition once the crank handle has been removed.

A further object of the present invention is the provision of an improved tarpaulin tightening device which is strong in construction, and which includes a locking device that relies upon gravity for holding the tarpaulin in its tightened condition.

A further object of the present invention is the provision of an improved tarpaulin tightening device and method for using same which is economical to manufacture, durable in use and efficient in operation.

BRIEF SUMMARY OF THE INVENTION

The foregoing objects may be achieved by a cover assembly for an elongated container having first and second end walls, first and second side walls, a bottom wall and an upwardly presented opening. The cover assembly comprises a flexible cover having a first edge operatively attached to the first side wall of the container. An elongated bar is attached to the second edge of the flexible cover and is positioned adjacent the second side wall of the container so that the flexible cover extends in covering relation over the upwardly presented opening of the container.

A crank means is provided for rotating the bar to roll and unroll the bar transversely of the container toward and away from the first side wall of the container. The crank means may be a manually operated crank handle or it may be other manual or powered devices for rolling and unrolling the bar and tarpaulin.

A tightening assembly comprises a pawl and a holding member movably attached to the container. The tightening assembly further comprises a bar extension member attached to the first end of the bar and having a ratchet member thereon. The pawl is movable from an engaged position engaging the ratchet member to permit rotation of the ratchet member in only one rotational direction, to a disengaged position free from engagement with the ratchet member. The holding member is movable from an engaged position engaging one of the bar or the bar extension member and limiting movement of the ratchet member away form the pawl when the pawl is in its engaged position. The holding member is movable to a disengaged position wherein the holding member is free from engagement with either the bar or the bar extension member so as to permit the ratchet member to move away from the pawl.

DETAILED DESCRIPTION OF THE INVENTION

Figure 1:
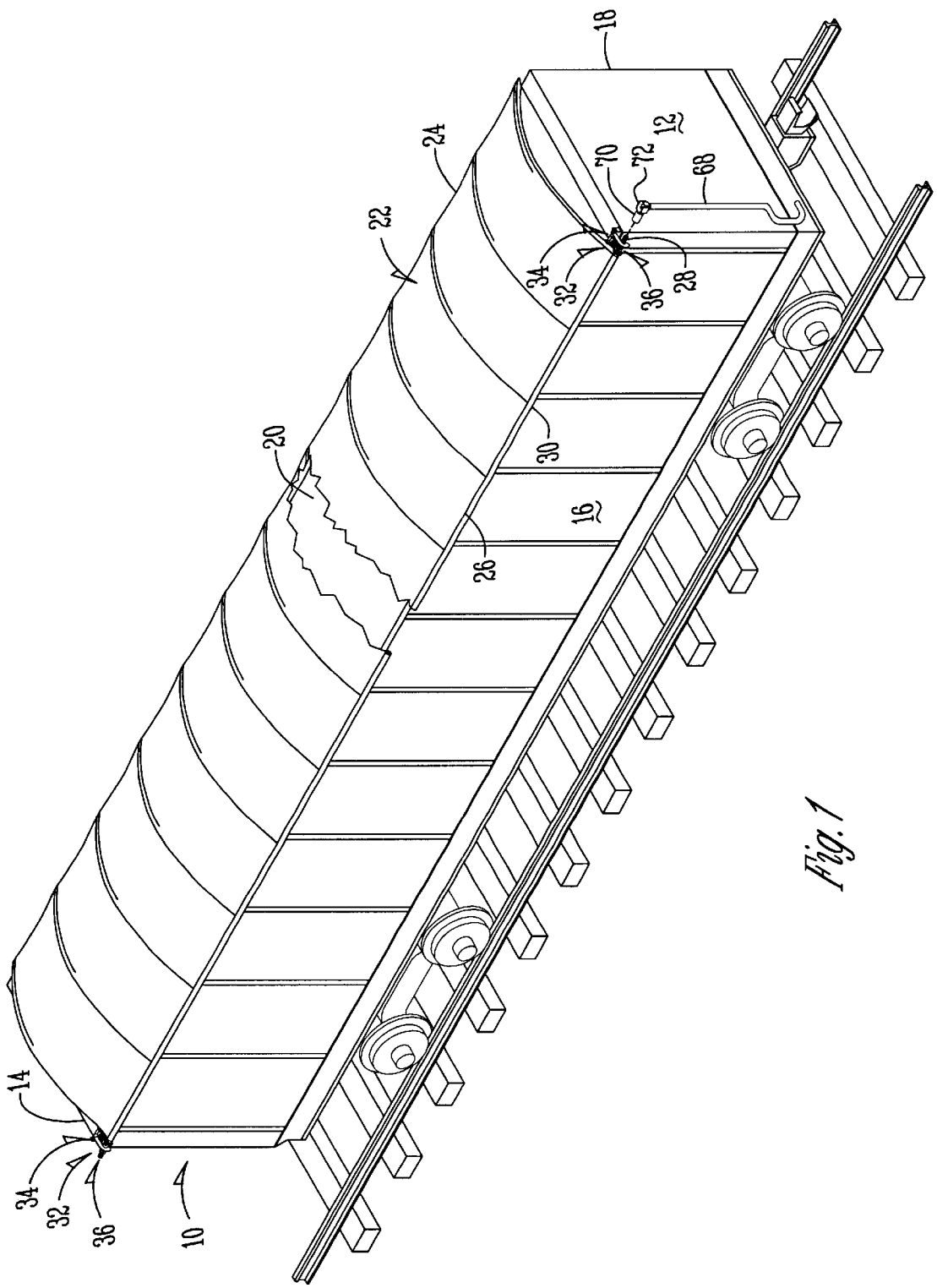
FIG. 1 is a perspective view of a railroad car having the tarpaulin tightening device mounted thereon.

Referring to the drawings the numeral 10 generally designates a container having end walls 12, 14, side walls 16, 18, and an upwardly presented opening 20. Container 10 could be a trailer for a truck, a container mounted on a railroad car or other transporting device, or a railroad car itself.

A cover or tarpaulin 22 includes a first edge 24 which is attached to the upper edge of side wall 18 of container 10. The opposite second edge 26 of the tarpaulin 22 is attached to a bar 28 so that the bar 28 can be rotated to create a roll 30 of the tarp around the bar 28.

Figure 6:
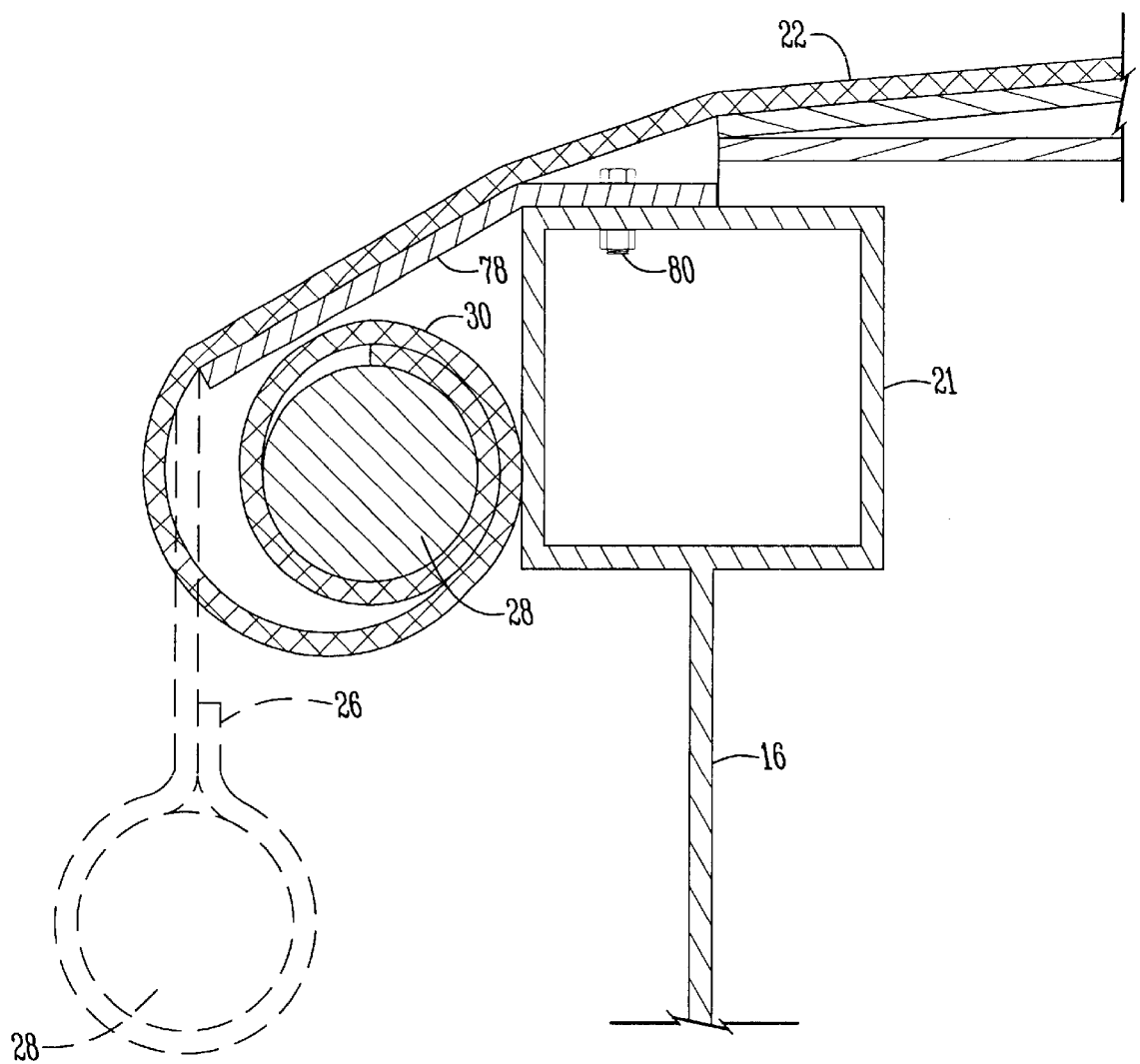
FIG. 6 is a sectional view taken along line 6—6 of FIG. 2.

Referring to FIG. 6, an elongated lip flange 78 is mounted adjacent the upper end of side wall 16, and the bar 28 is permitted to roll up beneath the angled flange 78 for attaching the tarpaulin to the side 16 in covering relation over the open upper end 21 of the container 10. Flange or plate 78 is mounted to the upper edge of side wall 16 by means of a bolt 80.

As can be seen in phantom lines in FIG. 6, the bar 28 is permitted to dangle below the lower edge of flange 78. By rotating the bar 28, the tarpaulin rolls up with roll 30 being located beneath the flange 78.

Numeral 32 generally designates the tightening assembly of the present invention. The tightening assembly 32 includes a pawl and holder assembly 34 and a bar extension assembly 36. The pawl and holder assembly 34 includes a base 38 which is attached to the upper edge of the end wall 12 by means of bolt 40. Extending upwardly from the forward and rear ends of base 38 are a pair of spaced apart ears 42 which have a pivot pin 44 extending therebetween. Mounted over the pivot pin for pivoting movement thereon is a pawl sleeve 46 having a pawl 48 on the end thereof and having a pawl handle 50 mounted thereto. At the tip of pawl 48 are a pair of spaced apart fingers 49, 51 which have a slot 53 positioned therebetween. A holder shank 52 includes an opening extending through one of its ends and surrounding the pivot pin 44 for pivotal movement thereon. At the opposite of holder shank 52 is a holder hook 54 and a handle 56 is welded thereto.

Figure 5:
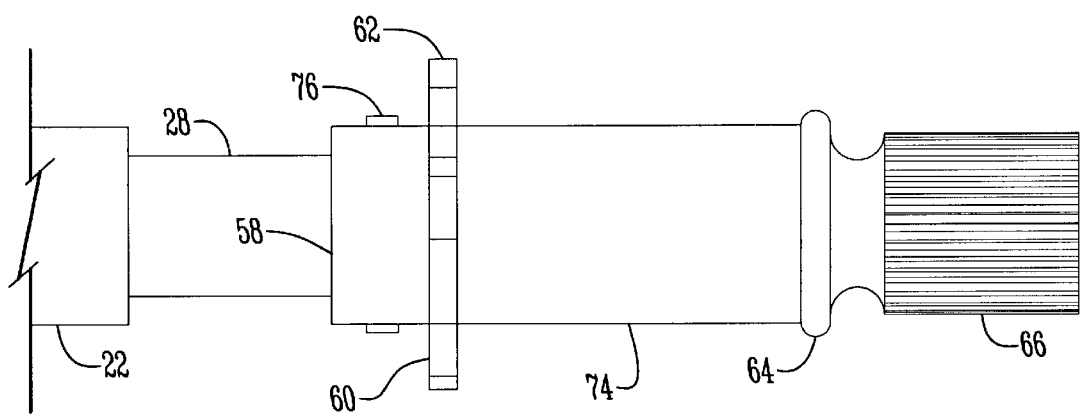
FIG. 5 is a side elevational view taken along line 5—5 of FIG. 4.

The tightening assembly 32 also includes a bar extension assembly 36 comprising a bar extension sleeve 58 having a ratchet wheel 60 welded thereto with ratchet teeth 62 at its periphery. A positioning rim 64 is provided in axial spaced relation to the ratchet wheel 60 and provides a bearing surface 74 therebetween. Extending axially from the positioning rim 64 is a spline head 66 having splines thereon. The spline head could also be square in cross section or have other configurations that would enable it to be gripped by a crank sprocket 70 of a crank handle 68. A universal joint 72 is provided between the crank socket 70 and the handle 68 so as to permit the handle to be rotated from various angles while the socket 70 is retentively engaging the spline head 66. Sleeve 58 is telescopically fitted over the end of bar 28 as can be seen in FIG. 5. A bolt 76 extends through sleeve 58 and a diametric bore (not shown) in bar 28.

In operation, the crank handle 68 is mounted over the splined head 36, and the tarpaulin 22 is unrolled from a position wherein the bar 28 is adjacent the side wall 24 to a position wherein the bar 28 is adjacent the side wall 16 as shown in FIG. 1. This causes the tarpaulin to be unrolled in covering relation over the upwardly presented opening 20. The crank handle 68 may be used but other types of cranking means may be used. A power crank may be used such as shown in U.S. Pat. Nos. 4,518,193 and 4,529,098 or other types of power or manual cranking means may be used. Similarly the crank socket 70 and the splined head 66 may be of different configuration such as square, triangular, hexagonal, or other configurations so long as they match and so long as the crank socket 70 mates in telescoping relation over the head 66.

As can be seen in FIG. 6, the tarpaulin is completely unrolled to the position shown in shadow lines in FIG. 6 with the bar 28 dangling below the lower edge of angle flange 78. The bar 28 is then rotated further to cause the creation of roll 30 and to cause the bar to move upwardly with the roll 30 engaging the under surface of angular flange 78.

Figure 2:
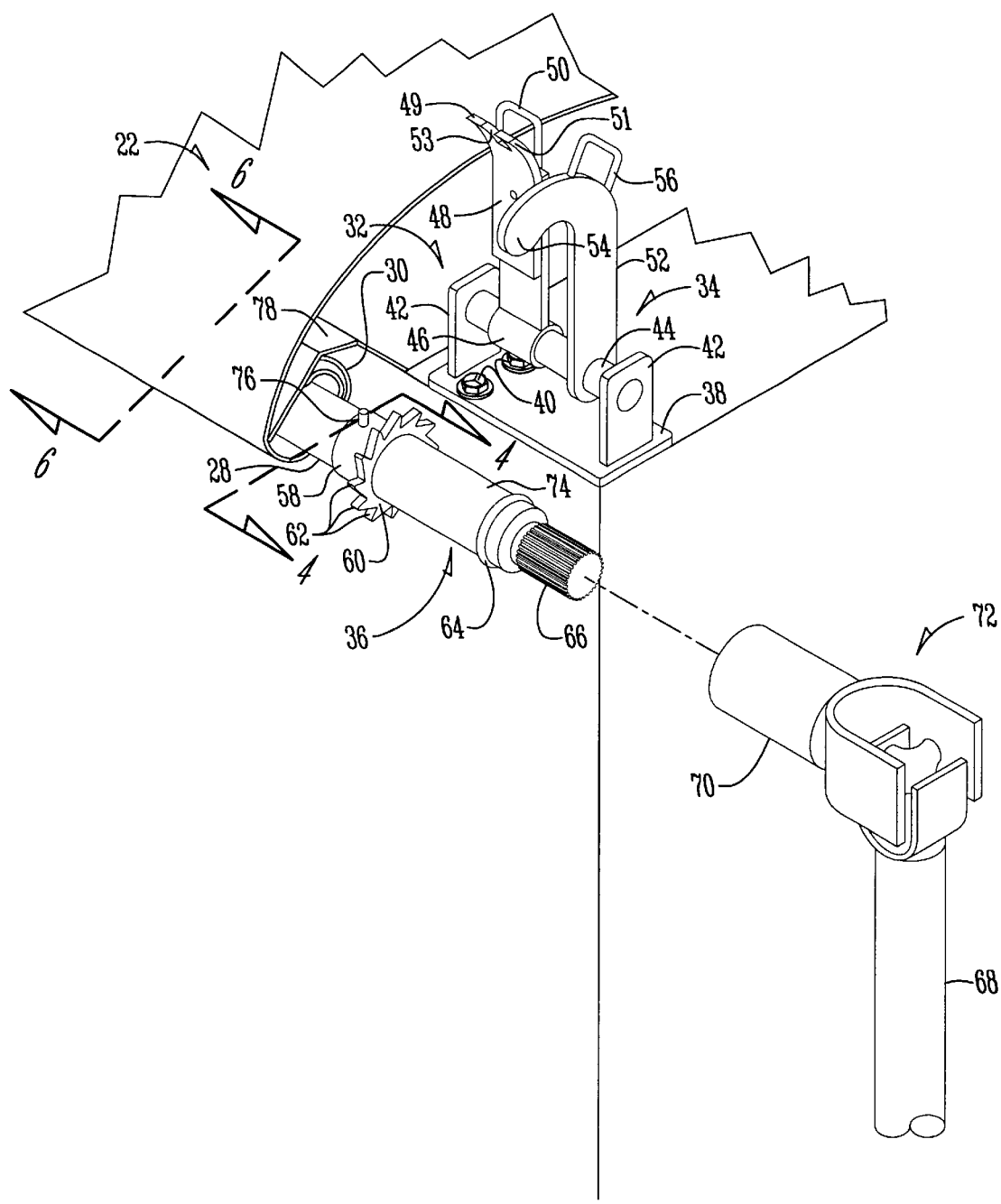
FIG. 2 is an enlarged detailed perspective view of the tarpaulin tightening device shown in its disengaged position.
Figure 3:
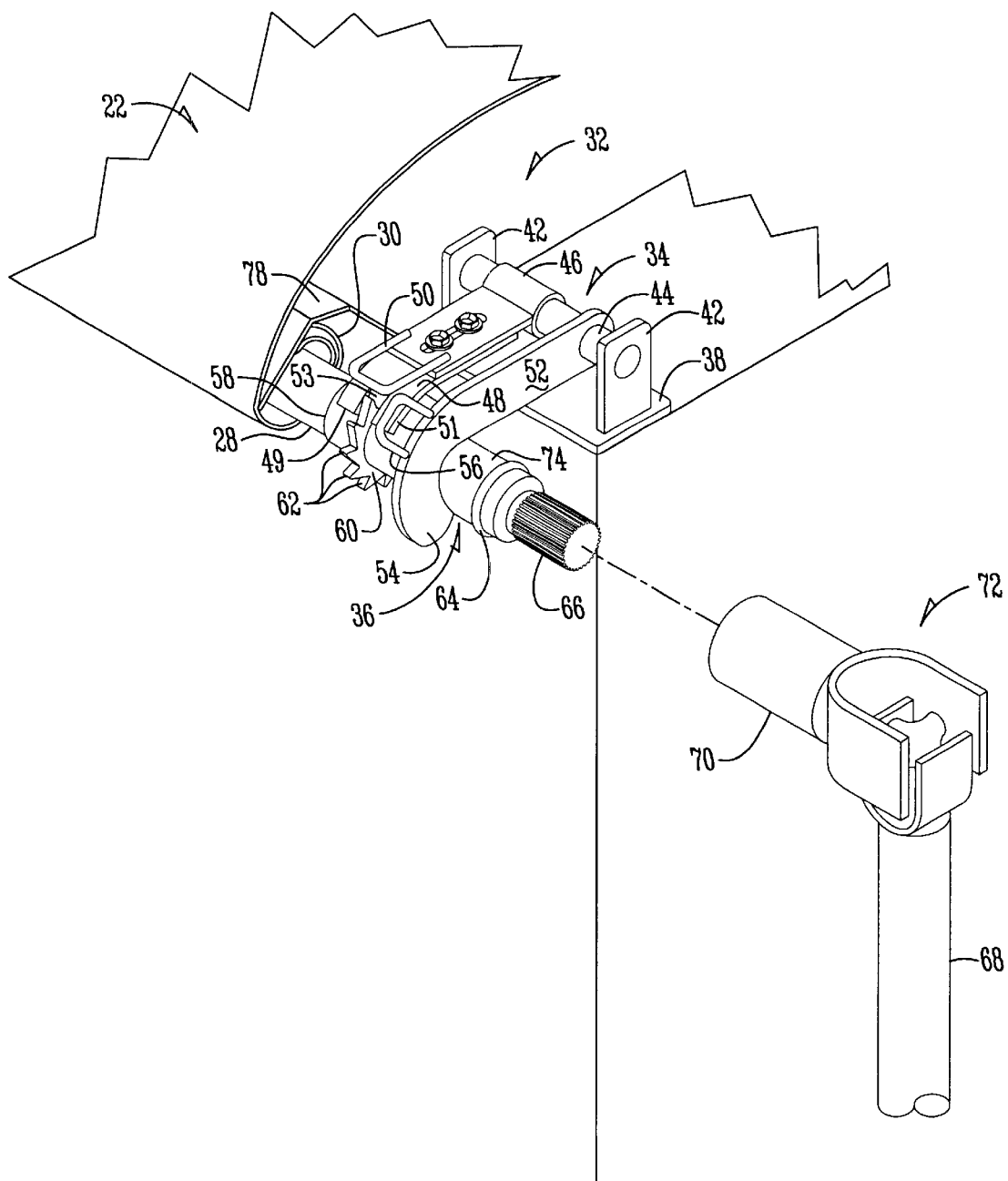
FIG. 3 is a view similar to FIG. 2, but showing the tarpaulin tightening device in its engaged position.
Figure 4:
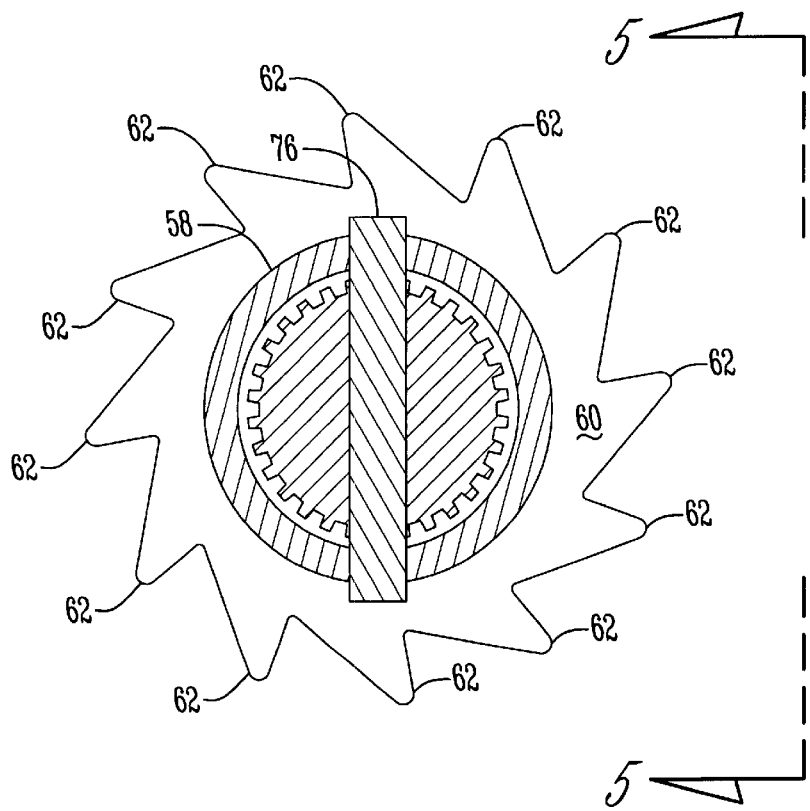
FIG. 4 is a sectional view taken along line 4—4 of FIG. 2.

At this point, the pawl 48 and the holding member 52 are pivoted from their disengaged positions shown in FIG. 2 to their engaged positions shown in FIG. 3. In their engaged positions, the pawl 48 engages the teeth 62 of the ratchet reel 60, with the two spaced apart legs 49, 51 bracing the opposite sides of ratchet wheel 60 and with the slot 53 engaging the teeth 62 of ratchet 60.

Similarly the hooked member 54 is pivoted to the position shown in FIG. 3 so that it engages the bearing surface 74. The ridge 64 keeps the hook member 54 in proper orientation with respect to the bar extension assembly 36 and prevents the hook member from moving axially beyond the rim 64.

Gravity is sufficient to hold the pawl 48 against the teeth 62 of ratchet 60. Similarly, gravity holds the hook member 54 in hooked relation over the bearing surface 74. However, the crank handle 68 can still rotate the bar extension 36 with the hook member 54 bearing against the bearing surface 74. The ratchet teeth 62 permit tightening of the tarpaulin 22, but do not permit it to become loosened. Thus it is possible to crank the bar extension 36 and the bar 28 until a sufficiently desired tension is achieved in the tarpaulin 22.

When it is desired to remove the tarpaulin, the hook member 54 and the pawl 48 are pivoted upwardly to their disengaged positions thereby freeing the bar 28 to move to its dangling position shown in shadow lines in FIG. 6. Further rotation of the bar 28 causes it to roll up the tarpaulin and open the upwardly presented opening 20.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A cover assembly for an elongated container having first and second end walls, first and second side walls, a bottom wall and an upwardly presented opening, said cover assembly comprising:

a flexible cover having a first edge operatively attached to said first side wall of said container;

an elongated bar having first and second opposite ends;

said flexible cover having a second edge attached to said elongated bar;

said elongated bar being positioned adjacent said second side wall of said container so that said flexible cover extends in covering relation over said upwardly presented opening of said container;

crank means for rotating said bar to roll and unroll said bar transversely of said container toward and away from said first side wall of said container;

a tightening assembly comprising a pawl and a holding member movably attached to said container;

said tightening assembly further comprising a bar extension member attached to said first end of said bar and having a ratchet member thereon;

said pawl being movable from an engaged position engaging said ratchet member to permit rotation of said ratchet member in only one rotational direction to a disengaged position free from engagement with said ratchet member;

said holding member being movable from an engaged position engaging one of said bar or said bar extension member and limiting movement of said ratchet member away from said pawl when said pawl is in said engaged position, to a disengaged position wherein said holding member is free from engagement with said one of said bar or said bar extension member so as to permit said ratchet member to move away from said pawl.

2. A cover assembly according to claim 1 wherein said pawl and said holding member are pivotally mounted to said tightening assembly for swinging movement between their said respective engaged and disengaged positions.

3. A cover assembly according to claim 2 wherein said tightening assembly comprises a base attached to said container, said pawl and said holding member being pivotally mounted to said base.

4. A cover assembly according to claim 1 wherein said bar extension member further comprises an elongated bearing member and a crank engaging member.

5. A cover assembly according to claim 4 wherein said holding member engages said elongated bearing member when said holding member is in said engaged position.

6. A cover assembly according to claim 5 wherein said crank engaging member is adapted to be frictionally engaged by said crank means for rotating said bar.

7. A cover tightening assembly for a container having first and second end walls, first and second side walls, and an upwardly presented opening; a flexible sheet member having a first edge attached to said first side wall and a second edge, a bar attached to said second edge of said sheet member and extending along said second side wall; said tightening assembly comprising;

a bar extension member attachable to said bar and having a ratchet thereon;

a base adapted to be attached to said container adjacent said second side wall;

a pawl movably mounted to said base for movement from an engaged position engaging said ratchet when said bar extension member is attached to said bar so as to permit rotation of said bar in only one rotational direction, to a disengaged position free from engagement with said ratchet;

a holding member movably mounted to said base for movement from an engaged position engaging one of said bar or said bar extension member when said bar extension member is attached to said bar to prevent movement of said ratchet away from said pawl, to a disengaged position free from engagement with said one of said bar or said bar extension member to permit said ratchet away from said pawl.

8. A cover assembly according to claim 7 wherein said pawl and said holding member are each pivotally mounted to said base for swinging movement between their said respective engaged and disengaged positions.

9. A cover assembly according to claim 8 wherein said bar extension member is elongated having a longitudinal bar extension member axis, and said bar is elongated having a longitudinal bar axis approximately coinciding with said bar extension member axis.

10. A cover assembly according to claim 9 wherein said pawl is pivotal about a pawl axis and said holding member is pivotal about a holding member axis, said pawl axis and said holding member axis extending parallel to said bar extension member axis and said bar axis.

11. A method for tightening a flexible sheet member in covering relation over an upwardly presented opening of a container having first and second side walls, said sheet member having a first edge attached to said first side wall and a second edge attached to a bar positioned adjacent said second side wall of said container; said method comprising:

attaching a bar extension to said bar, said bar extension having a ratchet member thereon;

engaging said ratchet member with a pawl mounted on said container for permitting rotation of said bar in one direction and for preventing rotation of said bar in the opposite direction;

engaging one of said bar or said bar extension with a holding member mounted on said container for preventing movement of said ratchet away from engagement with said pawl;

rotating said bar in said one direction to cause tightening of said sheet member over said upwardly presented opening of said container;

removing said pawl and said holding member from engagement with said ratchet member and said one of said bar or said bar extension respectively;

rotating said bar to cause rolling of said bar toward said first side wall and wrapping of said sheet member around said bar and thereby removing said sheet member from covering relation over said upwardly presented opening of said container.

* * * * *